United States Patent [19]

Hirano

[11] Patent Number: 5,526,082
[45] Date of Patent: Jun. 11, 1996

[54] AUTOMATIC VISIBILITY REGULATOR FOR A CAMERA VIEWFINDER

[75] Inventor: Nagayoshi Hirano, Ohmiya, Japan

[73] Assignee: Fuji Photo Optical Co., Ltd., Japan

[21] Appl. No.: 324,649

[22] Filed: Oct. 18, 1994

[30] Foreign Application Priority Data

Oct. 19, 1993 [JP] Japan .................................. 5-283933

[51] Int. Cl.⁶ ................................................ G03B 13/02
[52] U.S. Cl. ................................................ 354/219
[58] Field of Search ........................... 354/403, 62, 219, 354/410

[56] References Cited

U.S. PATENT DOCUMENTS

| | | |
|---|---|---|
| 741,102 | 10/1903 | Borsum . |
| 1,489,329 | 4/1924 | Moffitt . |
| 2,173,553 | 9/1939 | Graf . |
| 2,302,584 | 11/1942 | Steiner . |
| 4,072,971 | 2/1978 | Kuboshima .............................. 354/201 |
| 4,828,381 | 5/1989 | Shindo .................................. 354/62 X |
| 5,255,033 | 10/1993 | Dassero ............................... 354/149.11 |
| 5,335,030 | 8/1994 | Suzuka ................................. 354/222 X |

OTHER PUBLICATIONS

Pending U.S. patent application Ser. No. 08/302,049, filed Sep. 7, 1994, entitled *Viewfinder Arrangement In Photographic Camera*, filed by Tsuyuki et al.

*Primary Examiner*—W. B. Perkey
*Attorney, Agent, or Firm*—Price, Heneveld, Cooper, DeWitt & Litton

[57] ABSTRACT

An automatic visibility regulator for a camera viewfinder includes a focusing detector system that is adapted to detecting whether or not an object image to be photographed, having passed through the viewfinder, is focused on the retina of the user's eyeball and a focal position shifting device adapted to shifting a focal position of an ocular system and thereby to shift a position at which the object image is focused. The focal position shifting device is actuated to shift the ocular system when the focusing detector system detects that the object image is not focused on the retina of the user's eyeball. The focal position shifting device is not actuated, and, consequently, the focal position of the ocular system is not changed, when the focusing detector system detects that the object image is focused on the retina. The focusing detector system includes a combination of a photo projector and a photodetector, wherein a beam of light projected from the projector passes through the ocular system and is reflected on the retina of the user's eyeball. The beam of light passes again through the ocular system and is received by the photodetector. Properties of the received beam of light determine whether or not the object image is focused on the retina. If it is determined that the object image is not focused on the retina, the focal position shifting device is actuated to shift the focal position of the ocular system until the object image is focused on the retina. In this manner, visibility is automatically adjusted to an appropriate value without any adjustment operation by user.

18 Claims, 2 Drawing Sheets

AUTOMATIC VISIBILITY REGULATOR FOR A CAMERA VIEWFINDER

BACKGROUND OF THE INVENTION

1. Technical Field

The present invention relates to an automatic visibility regulator for a camera viewfinder to regulate the visibility of the viewfinder.

2. Prior Art

A photographic camera is usually provided with a viewfinder to determine a scene or object to be photographed. In the case of a direct viewfinder camera, for example, the view finder is provided separately of its photographing optical system. Such view finder is broadly classified into either the real image-type viewfinder involving image formation of an object to be photographed in the optical system of the viewfinder or the virtual image-type viewfinder not involving such image formation.

As schematically illustrated by FIG. 2, a real image-type viewfinder 1 comprises an objective 2 facing the object to be photographed, a Porro prism 4 provided behind the objective 2 and a reticle 6 provided behind the Porro prism 4. An inverted image of the object is made erect by the Porro prism 4 and image is formed on the reticle 6 so as to be observed by the user through an ocular member 8.

The ocular member 8 is movable along an optical axis S under actuation of a visibility regulator (not shown). This arrangement allows the individual users, particularly those suffering from myopia, hyperopia, or the like, to have an optimum visibility through the viewfinder 1 depending on their own visual acuities.

With the conventional viewfinder 1 of the above-mentioned arrangement, however, the visibility regulator has required a difficult manual adjustment by the user to achieve desired regulation of visibility. In addition, proper visibility regulation has not necessarily been achieved by the user's manual adjustment. There exists a concern that the visibility regulation might be insufficiently effective or even make the viewfinder inconvenient to use.

Furthermore, in particular situations, a user may forget the presence of the visibility regulator, or is not aware of the presence of the visibility regulator, particularly when the user is inexperienced in handling the camera. In such case, the user is forced to use a viewfinder which is hard to look through for extended periods, creating fatigue in the user's eyes. Consequently, photographing becomes annoying for such user who may, as a result, miss an opportunity to photograph an image of interest to that user.

SUMMARY OF THE INVENTION

The present invention provides an automatic visibility regulator that achieves a viewfinder, which is easy to look through and does not tire the eye without any difficult manual regulation of visibility by the user.

An automatic visibility regulator for camera view finders, according to the invention, includes a focusing detector means adapted to detect whether or not an object image to be photographed having passed through the view finder is focused on the retina of the user's eyeball and focal position shifting means adapted to shift a focal position of an ocular system and thereby to shift a position at which said object image is focused. The focal position shifting means is actuated to shift the ocular system when the focusing detector means detects that said object image is not focused on the retina of the user's eyeball. The focal position shifting means is not actuated, and, consequently, the focal position of said ocular system remains unchanged, when said focusing detector means detects that said object image is focused on said retina.

In photographing, an object to be photographed is caught by said camera viewfinder and then observed by the user through an optical system, including an ocular member, as the user directs the camera at said object. Thereupon, said focusing detector means is actuated to detect whether said object image is focused on the retina of the user's eyeball.

Preferably, the focusing detector means includes a combination of a projector means and a photodetector means so that a beam of light projected from said projector means passes through said ocular system and is reflected on the retina of the user's eyeball, said beam of light passes again through said ocular system and is received by said photodetector means. It is determined as a result of the state of this received beam of light whether or not the object image is focused on said retina.

Preferably, said projector means and said photodetector means are located substantially in an extension plane of the viewfinder's image formation surface and the optical path length from said projector or photodetector means to the retina is substantially equal to the optical path length from said image formation surface to the retina.

Such arrangement of the focusing detector means allows reliable detection of whether or not the object image is focused on the retina because the degree to which the object image on the image formation surface is focused on the retina substantially coincides with the degree to which the beam of light projected from said projector means is focused on the retina. More specifically, when the beam of light projected from the projector means is focused on the retina, the beam of light reflected on the retina is concentratedly received by the photodetector means substantially as a single point and, when the beam of light projected from the projector means is not focused on the retina, the beam of light reflected on the retina is received by the photodetector as a spot having a certain diameter. In this way, the degree to which the object image is focused on the retina can be evaluated by the configuration of the beam of light received by the photodetector.

Preferably, the image formation surface of the viewfinder is provided face-to-face with the ocular system. With this arrangement, the image formation surface and the retina are relatively close to each other, allowing the state of focusing to be more accurately evaluated. When said focusing detector means detects that the object image is not focused on the retina, the focal position shifting means is actuated to shift the focal position of the ocular system and thereby to shift the plane in which the object image should be focused.

Preferably, there is provided switching means to switch the focusing detector means between its actuated and non-actuated states.

Specifically, it is unnecessary for the focusing detector means to be actuated every time the user looks in the viewfinder, if the user is the same, because the visibility will be substantially constant for the one and the same user. In view of this fact, it is preferred to provide a selector switch by which the focusing detector means can be selectively turned on or off and thereby actuated or non-actuated, respectively.

Preferably, the focal position shifting means includes a lens driving mechanism actuated to shift the lenses constituting the ocular system and thereby to change the focal position of the ocular system. With such arrangement, the focal plane of the object image will be adjustably shifted along the optical path of the viewfinder in proximity of the retina in the user's eyeball and the object image will be focused on the retina in the course of such adjustment.

The focusing detector means detects when the object image is focused on the retina and thereupon actuation of said focal position shifting means is discontinued. The state in which the object image is focused on the retina is indicated, and the viewfinder visibility is regulated to a value appropriate for the individual user.

It should be understood that the invention may be used with a view finder that may be selected from the real image-type viewfinder and the virtual image-type viewfinder, both for a direct viewfinder camera, and the viewfinder for a single-lens reflex camera. In this manner, the automatic visibility regulator, according to the invention, can be used with many types of camera viewfinders.

DETAILED DESCRIPTION OF THE EMBODIMENT

The automatic visibility regulator for a photographic viewfinder, according to the invention, will be more specifically described in connection with an embodiment illustrated in the accompanying drawing. It should be understood that, in the case of this specific embodiment, the automatic visibility regulator is arranged to be used with a photographic camera provided with a non-reflex-type viewfinder so as to be operatively associated therewith, particularly when the viewfinder is of real image type.

Figure 1:
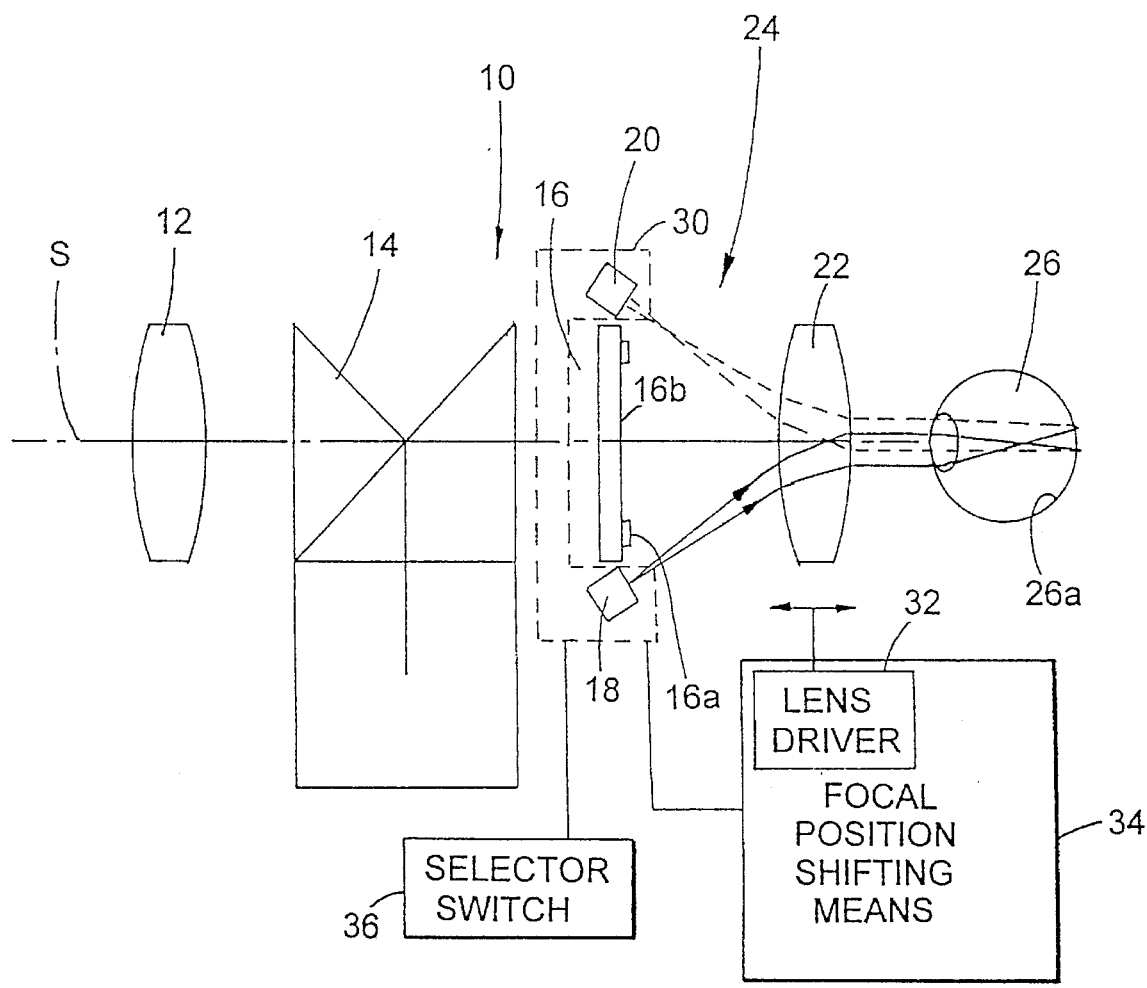
FIG. 1 is a schematic plan view illustrating an automatic visibility regulator for a viewfinder, according to the invention, in combination with an image-type viewfinder.
Figure 2:
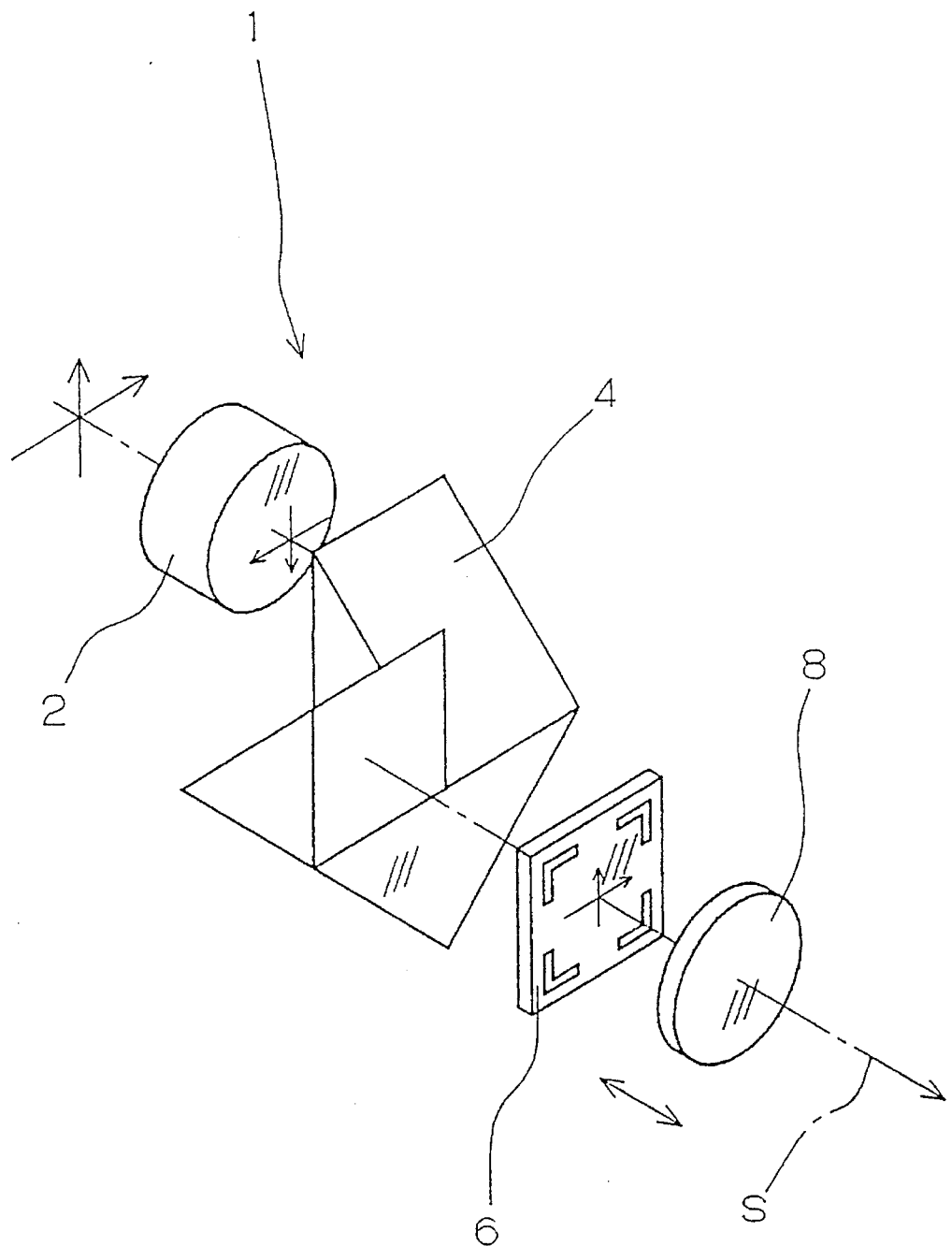
FIG. 2 is a schematic perspective view illustrating a real image-type viewfinder of the prior art.

Referring to FIG. 1, an optical system of a real image-type viewfinder 10 includes at a front end of its optical path an objective 12 facing an object to be photographed (not shown) and a Porro prism 14 provided behind said objective 12. Behind the Porro prism 14, there is provided a reticle 16, which includes, in turn, a field frame mark 16a and an image formation surface 16b on which an image of the object to be photographed is formed.

Adjacent the field frame mark 16a of the reticle 16, there are provided on the extension plane of the image formation surface 16b a projector element 18 and a photodetector element 20, both of which are rearwardly oriented and constitute together focusing detector means 30.

Behind the reticle 16, there is provided an ocular element 22, which a user's eyeball 26 will be brought in proximity to during photographing. The ocular element 22 is movable along the optical path S in operative association with a lens driving mechanism 32 serving as focal position shifting means. The lens driving mechanism may be an existing driving mechanism for the ocular element 22 in the visibility regulator, which is automated utilizing a suitable power source. An alternative arrangement may utilize a focusing lens driving mechanism included in the automatic focusing device, or the like.

The projector element 18, the photodetector element 20, the ocular 22, and the lens driving mechanism 32 constitute together an automatic visibility regulator 24. The specific embodiment of the automatic visibility regulator, according to the invention of the arrangement as has been described above, operates in such a manner as will be described.

In actual operation of photographing, a user looks in the viewfinder 10 with his or her eyeball 26 being brought close to the ocular element 22 and aims the camera body at an object to be photographed, as illustrated in FIG. 1. An image of said object is inverted after passing through the objective 12, then made erect again after passing through the Porro prism 14 and image-formed on the image formation surface 16b of the reticle 16. The image of the object then passes through the ocular element 22, together with the field frame defined by the field frame mark 16a, and enters into the user's eyeball 26. Thereupon, the projector element 18, provided adjacent the field frame mark 16a, projects a beam of light which passes through the ocular element 22 and reaches the retina 26a of the user's eyeball 26 as indicated by the solid lines in FIG. 1. The beam is reflected by the retina 26a as indicated by the broken lines in FIG. 1 and, after passing again through the ocular element 22, is received by the photodetector element 20 provided adjacent the field frame mark 16a.

When the object image and the field frame formed on the image formation surface 16b are focused on the retina 26a, the beam of light projected from the projector element 18 is also focused on retina 26a. As a result, a light distribution pattern of the beam of light received by the photodetector element 20 is concentrated substantially in a single point having distinctness. When the object image as well as the field frame are not sufficiently focused on the retina 26a, as illustrated in FIG. 1., on the other hand, the beam of light projected from the projector element 18 is also not sufficiently focused. As a result, a light distribution pattern of the beam of light received by the photodetector element 20 will have a corresponding extent resulting in an indistinctness. In this manner, the light distribution pattern of the beam of light received by the photodetector element 20 indicates whether or not the object image and the field frame are well focused on the retina 26a.

When it is determined that the object image and the field frame on the image formation surface 16b are not well focused on the retina 26a, the lens driving mechanism 32 is actuated to move the ocular element 22 along the optical path S. During such movement of the ocular element 22, the projector element 18 and the photodetector element 20 continue their projection and reception of light, respectively, and, upon determination that the object image and the field frame are focused on the retina 26a, actuation of the lens driving mechanism 32, and, therefore, movement of the ocular element 22, are stopped. In this manner, visibility of the viewfinder 10 can be appropriately regulated as a function of the distance from the image formation surface 16b of the reticle 16 to the user's retina 26a.

As will be apparent from the foregoing description, the illustrated embodiment allows a state of focusing to be detected by a focusing detector means 30 that includes a combination of the projector element 18 and the photodetector element 20 that is sufficiently non-complex that provision of such focusing detector means 30 will not cause a significant increase in complexity and cost for manufacturing of the camera.

According to the illustrated embodiment, the optical path length from the image formation surface 16b to the retina 26a is substantially equal to the optical path length from the projector element 18 or the photodetector element 20 to the retina 26a because projector element 18 and photodetector element 20 are provided in the extension plane of image formation surface 16b adjacent the field frame mark 16a of the reticle 16. Consequently, the state that the object image and the field frame on the image formation surface 16b are focused on the retina 26a substantially corresponds to the state that the beam of light projected from the projector element 18 is focused on the retina 26a. Therefore, it can be reliably detected that the object image and the field frame are focused on the retina 26a.

While the illustrated embodiment employs the arrangement such that the reticle 16 is provided behind the Porro prism 14, it is also possible to provide the reticle 16 in front of or within the Porro prism 14. In this way, a viewfinder of appropriate construction can be selected depending on the particular design of the camera body. While the illustrated embodiment employs the Porro prism 14 to achieve an erect image formation of the object to be photographed, any other means may be employed to achieve the erect image formation. For example, it is also possible to provide a relay lens at an appropriate position on the optical path of the viewfinder's optical system.

While the invention has been described in reference to the case in which the automatic visibility regulator 24 is operatively associated with a real image-type viewfinder 10, it is also possible to use the invention in operative association with a virtual image-type viewfinder, so that the visibility may be regulated depending on a distance to the object to be photographed. In this case, image formation of the object is not required, so the viewfinder can be miniaturized, a manufacturing cost can be reduced and a high visibility of the view finder can be achieved independently of the distance to the object to be photographed.

While the invention has been described in reference with the embodiment so arranged that the focusing detector means 30 will be necessarily actuated as the user looks in the viewfinder 10, it is unnecessary for the focusing detector means 30 to be actuated every time the user looks in the viewfinder. As long as the user is the same, the visibility will be substantially constant for the one and the same user. In view of this fact, it is preferred to provide a selector switch 36 by which said focusing detector means 30 can be selectively switched to be actuated or non-actuated so that a user different from the immediately proceeding user may operate the selector switch 36 to adjust the viewfinder to a visibility which is optimal to this user and, if the user is one and the same, the selector switch 36 may be operated so as to set the focusing detector means 30 in the non-actuated mode. In this way, the number of times by which said focusing detector means 30 should be actuated can be minimized to save energy consumption and thereby to lengthen a useful life of the power source.

While the invention has been described above in reference to the case in which the automatic visibility regulator 24 is used with the viewfinder of a direct viewfinder camera, such regulator 24 may be useful also with the viewfinder of a single-lens reflex camera so that the visibility may be adjustably optimized for an object image formed on a viewfinder screen of the single-lens reflex camera and thereby the optimal visibility for the individual user may be obtained in the same manner as in the above-mentioned embodiment.

Effect of the Invention

As will be understood from the foregoing description, the automatic visibility regulator for a camera viewfinder includes the focusing detector means and the focal position shifting means wherein, if the object image is detected to be out of focus on the user's retina, the focal position of the ocular element is automatically shifted until the object image is focused on the user's retina and the viewfinder visibility is adjustably optimized depending on the individual user's visual acuity. Thus, the visibility is automatically adjusted to an appropriate value for the individual user without difficult manual adjustment and operation of photographing is correspondingly simplified. Consequently, camera handling is substantially facilitated, becomes attractive, and opportunities of photographing are increased, even for users having neither skill nor experience. The invention is particularly useful for hypermetropic or myopic users.

The state of the focus can be detected by the focusing detector means independently of shapes as well as sizes of the individual users' eyeballs since said focusing detector means is adapted to determine whether the object image is focused or not on the retinas of the respective users' eyeballs. Accordingly, visibility can be reliably adjusted to an appropriate value even if the user wears spectacles or contact lenses.

Furthermore, the focusing detector means can be effectively used not only with a real image-type viewfinder but also with a virtual image-type viewfinder. In other words, arrangement of the automatic visibility regulator, according to the invention, is not limited by the type of viewfinder and, therefore, the type of viewfinder can be selected depending on type and purpose of a photographic camera. In this manner, design of the camera can be selected in a wide range and thereby many types of cameras can be provided.

The embodiments of the invention in which an exclusive property or privilege is claimed are defined as follows:

1. An automatic visibility regulator for a camera viewfinder comprising:

an ocular system;

an image formation surface disposed on an object side of said ocular system along an optical axis thereof;

focusing detector means for detecting whether or not an object image to be photographed having passed through the viewfinder is focused on the retina of the user's eyeball, said focusing detector means includes projector means and a photodetector means wherein a beam of light projected from said projector means passes through said ocular system and is reflected on said retina and wherein said beam of light passes again through said ocular system and is received by said photodetector means, wherein properties of the received beam of light determine whether or not said object image is focused on said retina, and wherein said projector means and said photodetector are located substantially in an extension plane of the said image formation surface and the optical path length from said projector or photodetector means to the retina is substantially equal to the optical path length from said image formation surface to said retina; and focal position shifting means adapted to shifting focal position of said ocular system and thereby to shift a position at which said object image is focused;

wherein said focal position shifting means is actuated to shift said ocular system when said focusing detector means detects that said object image is not focused on said retina; and wherein said focal position shifting means is not actuated and, consequently, the focal position of said ocular system is not changed when said focusing detector means detects that said object image is focused on said retina.

2. The automatic visibility regulator for a camera viewfinder according to claim 1, wherein said image formation surface is provided face-to-face with said ocular system.

3. The automatic visibility regulator for a camera viewfinder according to claim 1 including switching means to switch said focusing detector means between its actuated and non-actuated states.

4. The automatic visibility regulator for a camera viewfinder according to claim 1, wherein said focal position shifting means includes a lens driving mechanism actuated to shift lenses constituting said ocular system and thereby to change the focal position of said ocular system.

5. The automatic visibility regulator for a camera viewfinder according to claim 1, wherein said viewfinder is in the form of a real image-type viewfinder in a direct viewfinder camera.

6. The automatic visibility regulator for a camera viewfinder according to claim 1, wherein said viewfinder is in the form of a virtual image-type viewfinder in a direct viewfinder camera.

7. The automatic visibility regulator for a camera viewfinder according to claim 1, wherein said viewfinder is in the form of a viewfinder in a single-lens reflex camera.

8. The automatic visibility regulator for a camera viewfinder according to claim 2 including switching means to switch said focusing detector means between its actuated and non-actuated states.

9. The automatic visibility regulator for a camera viewfinder according to claim 2, wherein said focal position shifting means includes a lens driving mechanism actuated to shift lenses constituting said ocular system and thereby to change the focal position of said ocular system.

10. The automatic visibility regulator for a camera viewfinder according to claim 2, wherein said viewfinder is in the form of a real image-type viewfinder in a direct viewfinder camera.

11. The automatic visibility regulator for a camera viewfinder according to claim 2, wherein said viewfinder is in the form of a viewfinder in a single-lens reflex camera.

12. The automatic visibility regulator for a camera viewfinder according to claim 3, wherein said focal position shifting means includes a lens driving mechanism actuated to shift lenses constituting said ocular system and thereby to change the focal position of said ocular system.

13. The automatic visibility regulator for a camera viewfinder according to claim 5, wherein said viewfinder is in the form of a real image-type viewfinder in a direct viewfinder camera.

14. The automatic visibility regulator for a camera viewfinder according to claim 3, wherein said viewfinder is in the form of a viewfinder in a single-lens reflex camera.

15. The automatic visibility regulator for a camera viewfinder according to claim 4, wherein said viewfinder is in the form of a real image-type viewfinder in a direct viewfinder camera.

16. The automatic visibility regulator for a camera viewfinder according to claim 4, wherein said viewfinder is in the form of a viewfinder in a single-lens reflex camera.

17. The regulator as defined in claim 1, wherein said projecting means is positioned to project said light beam to said ocular system along a first optical path at an angle to the optical axis of said ocular system and said photodetector means is positioned to receive the reflected light beam propagating along a second optical path at an angle to the optical axis of said ocular system.

18. The regulator as defined in claim 1, wherein said image formation surface is the surface of a reticle.

* * * * *